United States Patent
Garandeau et al.

(10) Patent No.: US 9,390,073 B2
(45) Date of Patent: Jul. 12, 2016

(54) ELECTRONIC FILE COMPARATOR

(75) Inventors: Gael Garandeau, Saint Sebastien sur Loire (FR); Tanguy de Lignieres, Nantes (FR); Christophe Dagorn, Nantes (FR)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 8 days.

(21) Appl. No.: 13/048,045

(22) Filed: Mar. 15, 2011

(65) Prior Publication Data

US 2011/0238633 A1 Sep. 29, 2011

(30) Foreign Application Priority Data

Mar. 15, 2010 (EP) .................................... 10305254

(51) Int. Cl.
*G06F 17/30* (2006.01)
*G06F 17/22* (2006.01)

(52) U.S. Cl.
CPC ........ *G06F 17/2211* (2013.01); *G06F 17/3023* (2013.01); *G06F 17/30309* (2013.01)

(58) Field of Classification Search
CPC .................................................. G06F 17/2211
USPC ........................................................ 707/690
See application file for complete search history.

(56) References Cited

U.S. PATENT DOCUMENTS

| | | | | |
|---|---|---|---|---|
| 4,696,003 | A * | 9/1987 | Kerr .................... | G06F 11/3688 714/38.14 |
| 5,649,200 | A * | 7/1997 | Leblang et al. ................ | 717/122 |
| 6,236,993 | B1 * | 5/2001 | Fanberg ........................ | 707/690 |
| 2004/0019601 | A1 * | 1/2004 | Gates .................. | G06F 17/3071 707/1 |
| 2004/0199781 | A1 * | 10/2004 | Erickson et al. .............. | 713/200 |
| 2005/0097120 | A1 * | 5/2005 | Cooper et al. ................ | 707/102 |
| 2008/0183771 | A1 * | 7/2008 | Lee et al. ...................... | 707/203 |
| 2009/0125805 | A1 * | 5/2009 | Ananthanarayanan et al. ............................. | 715/255 |
| 2010/0057693 | A1 * | 3/2010 | Himstedt ............ | G06F 11/3672 707/E17.005 |

FOREIGN PATENT DOCUMENTS

WO WO-0054156 A1 9/2000
WO WO-0144943 A1 6/2001

OTHER PUBLICATIONS

European Search Report issued in EP Application 10305254 on Jun. 7, 2010.

* cited by examiner

*Primary Examiner* — Son T Hoang
(74) *Attorney, Agent, or Firm* — Mannava & Kang, P.C.

(57) ABSTRACT

The invention concerns a method of comparing by a comparator tool a pair of electronic data files each comprising a plurality of data elements, the method comprising: identifying at least one data element in each of said files; replacing the values of said at least one identified data elements in each of said files by a same reference value; comparing the files to detect differences between values of the data elements; and generating an output report indicating said differences.

10 Claims, 3 Drawing Sheets

ELECTRONIC FILE COMPARATOR

FIELD OF THE INVENTION

The present invention relates to a comparator for comparing electronic data files, and in particular to a comparator arranged to generate an output report indicating differences between a pair of input electronic data files.

BACKGROUND OF THE INVENTION

Figure 1:
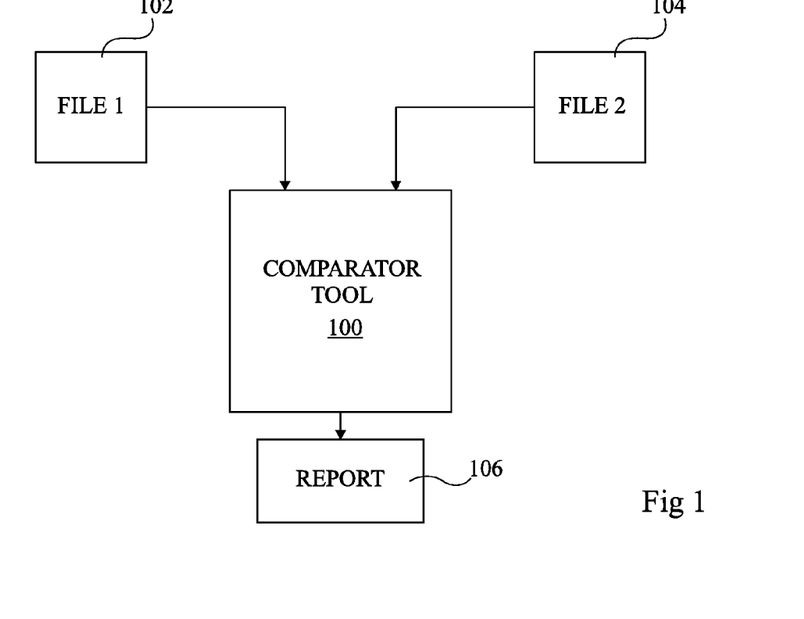
FIG. 1, described above, schematically illustrates an example of a comparator tool for comparing a pair of electronic data files.

FIG. 1 illustrates a file comparator tool 100, which receives first and second electronic data files 102, 104. The comparator tool 100 compares these files, and provides a report 106 at an output indicating differences between these files. In particular, the report for example indicates the differences in one of the files, such as file 104, with respect to a reference file, such as file 102.

When the files 102, 104 are very large, for example comprising hundreds or even thousands of megabytes of data, the comparison can be very slow. Furthermore, a high amount of processing is needed for preparing and outputting the report that indicates the difference between the electronic files.

There is thus a need for an improved comparator tool and the method for comparing electronic data files.

SUMMARY OF THE INVENTION

It is an aim of embodiments of the present invention to at least partially address one or more problems in the prior art.

According to one aspect of the present invention, there is provided a method of comparing by a comparator tool a pair of electronic data files each comprising a plurality of data elements, the method comprising: identifying at least one data element in each of said files; replacing the values of said at least one identified data elements in each of said files by a same reference value; comparing the files to detect differences between values of the data elements; and generating an output report indicating said differences.

According to one embodiment, the data elements are identified based on one or more filter parameters defining the content and/or the location of the element in each of the files.

According to another embodiment, the values of each of the at least one identified data element in each of the files is replaced by a same symbol, and according to yet another embodiment, the values of a first data element in each of said files are replaced by a first same reference value, and the values of a second data element in each of said files are replaced by a second same reference value different to said first same reference value.

According to another embodiment, said at least one data element comprises text having values indicating at least a date or time value.

According to another aspect of the present invention, there is provided a method of comparing a first set of electronic data files with a reference set of electronic data files, comprising pairing each file of said first set with a file of said reference set, and performing the above method on each pair of files.

According to another aspect of the present invention, there is provided a method of validating a new release of a computing application with respect to an older release of said computing application, the method comprising: generating output files by executing said older release and said new release computing application on common input data; and comparing said output files according to the above method.

According to another aspect of the present invention, there is provided an electronic storage medium storing a computer program arranged to implement the above method when executed by a processor.

According to another aspect of the present invention, there is provided a comparator for determining differences between a pair of electronic data files each comprising a plurality of data elements, the comparator comprising: a filtering unit arranged to filter said pair of files by identifying at least one data element in each of said files and replacing the values of said at least one data elements in each of said files by a same reference value; and a comparison unit arranged to compare said filtered pair of files, to generate a report of the differences detected between said files, and to output said report.

According to one embodiment, the comparator further comprises a pairing module arranged to pair each file of a first set of electronic data files with a file of a reference set of data files and to provide the paired files to the filtering unit.

According to another aspect of the present invention, there is provided a computing device comprising the above comparator, and a database storing said pair of electronic data files.

According to another aspect of the present invention, there is provided a device for validating a new release of a computing application with respect to an older release of said computing application, the device comprising: a least one input for receiving output files generated by executing said older release and said new release computing application on common input data; and the above comparator arranged to compare said output files.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which.

Throughout the figures, like features have been labelled with like reference numerals.

DETAILED DESCRIPTION OF EMBODIMENTS OF THE PRESENT INVENTION

Figure 2:
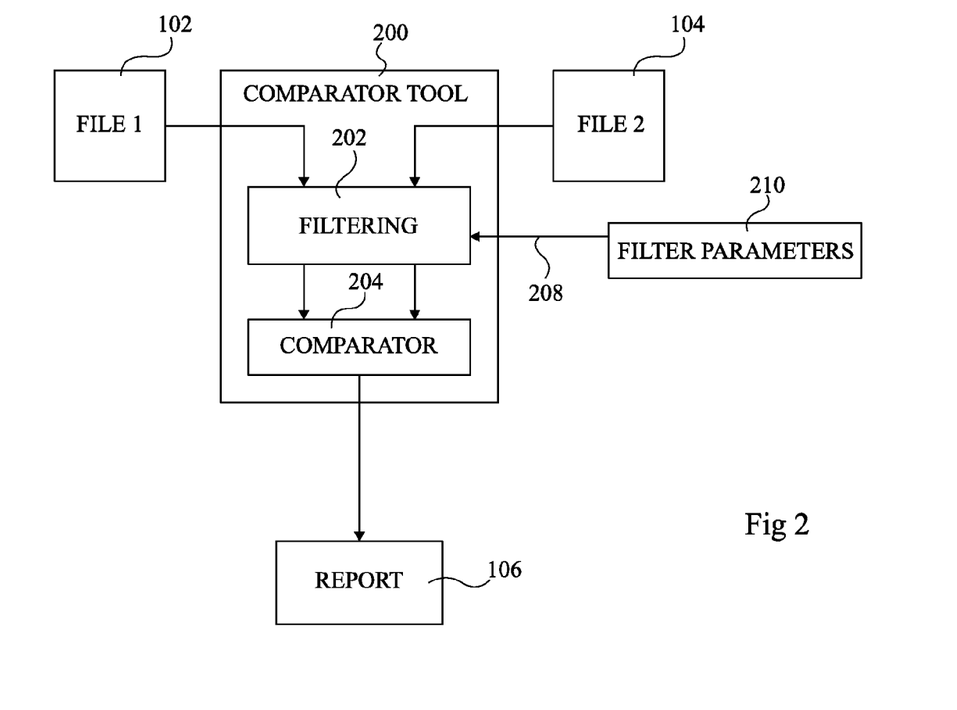
FIG. 2 schematically illustrates a comparator tool according to an embodiment of the present invention.

FIG. 2 illustrates a comparator tool 200 which, in a similar fashion to the comparator tool 100 of FIG. 1, receives first and second electronic data files FILE1 102, FILE2 104 and outputs a report 106 indicating differences between these files.

However, the comparator tool 200 additionally comprises a filtering block unit 202, which receives the files 102, 104 prior to comparison, and performs a filtering operation on the files. In particular, the filtering block 202 receives on an input line 208 filter parameters 210, and based on the filter parameters, identifies in the electronic data files 102 and 104 certain elements that constitute differences between the files that are not to be verified. The filter parameters are for example input in the form of files. For example, the verification of these differences is not critical to the user, and concerns inconsistent data such as dates, database identifications, etc. The identified elements are filtered out of the electronic data files 102, 104 prior to the comparison by comparator 204.

The filtered files are provided to a comparator 204 for performing the comparison, and the output report 106 is generated, indicating the differences between the filtered electronic data files. In the report 106, the elements that have been filtered out are not identified as differences between the files.

The electronic data files may be in any of a wide range of formats representing text data. For example, the files are flat files such as csv (comma separated values) files, text (.txt) files, binary files, HTML files, xml files in text mode, .dat files etc. Other formats could also be supported such as pdf files, Microsoft Excel (registered trademark) files, xml files in xml mode, having a tree structure, etc.

Figure 3:
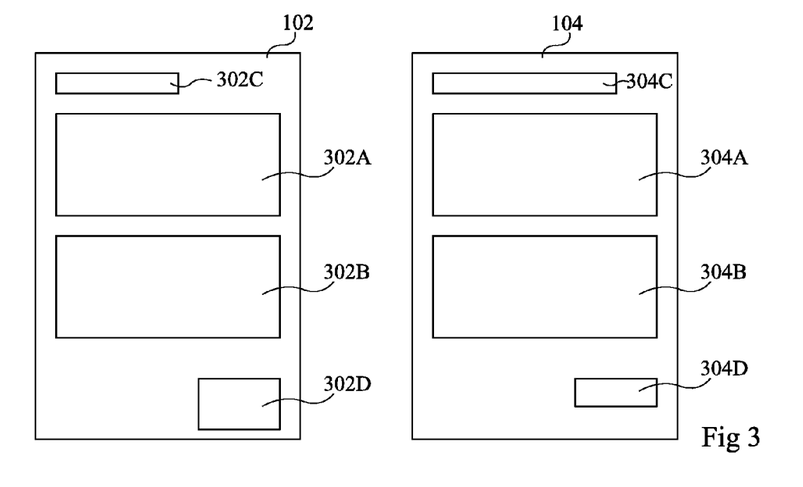
FIG. 3 schematically illustrates an example of a pair of files according to an embodiment of the present invention.

FIG. 3 illustrates an example of the layout of parts of the pair of electronic data files 102, 104, for example as viewed in a text editor or the like. Each of the files 102, 104 comprises a plurality of data elements, corresponding to blocks of one or more characters of text that may be grouped based for example on their position in the file, their contents, or other criteria.

File 102 comprises data elements 302A and 302B, which comprise sections of text data. Similarly, file 104 comprises data elements 304A and 304B, which also comprises sections of text data. There may be differences between the data elements 302A, 302B of file 102 and the corresponding data elements 304A, 304B of file 104, which can be detected by the comparator 204.

Additionally, the files comprise data elements 302C and 304C respectively, which for example comprise text indicating the date on which the respective files were last edited. The files also comprise data elements 302D and 304D respectively, which for example comprise characters indicating a release number of the file, and/or the names of the authors who have edited the documents. The data represented in the data elements 302C, 302D in file 102 is likely to be different from the corresponding data represented by data elements 304C, 304D in file 104, and would thus be detected as differences by the comparator 204. However, according to the embodiments described herein, the filter parameters designate the data elements 302C, 302D in file 102, and the data elements 304C, 304D in file 104, as being elements not to be compared by the comparator 204. Thus, prior to comparison, the filtering unit 202 removes these elements from the files, or replaces each element by a reference value that is identical in each file, such as the "@" symbol.

As an example, the data element 302C comprises the following text data:

"Last modified Thu June 28 23:21:54 CEST 2009 by John" and the data element 304C comprises the following text data:

"Last modified Wed August 15 21:43:01 CEST 2009 by Christopher".

During the filtering operation, both of these data elements are for example replaced by the text "@".

Figure 4:
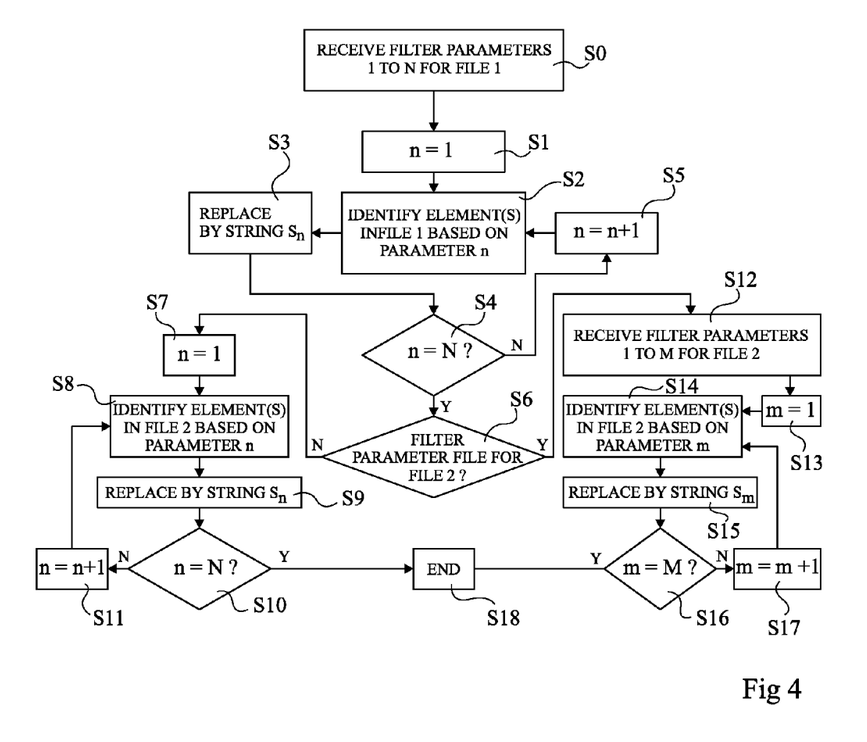
FIG. 4 is a flow diagram showing steps in a method for filtering files according to an embodiment of the present invention.

FIG. 4 is a flow diagram illustrating an example of steps implemented by the filtering unit 202 of FIG. 2.

In a first step S0, the filter parameters are received for the first file FILE1, and assigned values 1 to N, where N is equal to the total number of parameters. In this example, a single filter parameter designates the position of a data element in the data file.

In a next step S1, a value n is set equal to 1.

Next, in a step S2, one or more data elements corresponding to the nth filter parameter are identified in FILE1. For example, the filter parameter defines a data element based on its location in the file, although alternatively other techniques could be used, such as identifying certain characters present in the data element and/or the format of the data.

Next, in a step S3, any identified elements are replaced by a string $S_n$, which is for example a reference value generated in relation to filter parameter n. For example, the string $S_n$ could simply be the current value of n, in other words if n=1, the string n could simply be the character "1". Alternatively, the string could always be a fixed character, such as "@".

In a next step S4, it is determined whether or not n is equal to N. If not, then n is incremented in step S5, and the process returns to S2, and steps S2 to S4 are repeated based on the new value of n. If in step S4 n is equal to the final filter parameter N, the filtering process continues at step S6.

In step S6, it is determined whether or not there is a filter parameter file associated with FILE2. If not, the next steps are S7 to S10, in which filtering for FILE2 is performed based on the same filter parameters 1 to N as used for FILE1.

In particular, in step S7, n is again initialized at a value of 1, and then in a step S8 one or more data elements are identified in FILE2 based on parameter n. Next in step S9, identified elements are replaced by a string $S_n$, which as before could simply be the current value of n, or a fixed character, such as "@". In a next step S10, it is determined whether or not n is equal to N. If not, then n is incremented in step S11, and the process returns to S8, and steps S8 to S10 are repeated based on the new value of n. If in step S10 n is equal to the final filter parameter N, the next step is S18 in which the process ends, and the filtered files are exported to the comparator 204 for comparison.

If in step S6 it is determined that there is a filter parameter file for FILE2, the next step is S12 in which this file is received, and the parameters assigned values 1 to M. In some cases slightly different filter parameter files can be provided for the files FILE1 and FILE2 if for example the location of the elements to be filtered out is different in each file. Furthermore, while generally the numbers N and M of filter parameters are equal, in some cases they may be different, if for example one of the files contains an element to be filtered out that is not present in the other file.

After S12, the next step is S13, in which a value m is set equal to 1.

The next step is then S14, in which one or more elements is identified in FILE2 based on parameter m.

Next in step S15, identified elements are replaced by a string $S_m$, which could simply be the current value of m, or a fixed character, such as "@".

In a next step S16 it is determined whether or not m is equal to M. If not, then m is incremented in step S17, and the process returns to S14, and steps S14 to S16 are repeated based on the new value of m. If in step S16 m is equal to the final filter parameter M, the next step is S18 in which the process ends, and the filtered files are exported to the comparator 204 for comparison.

Figure 5:
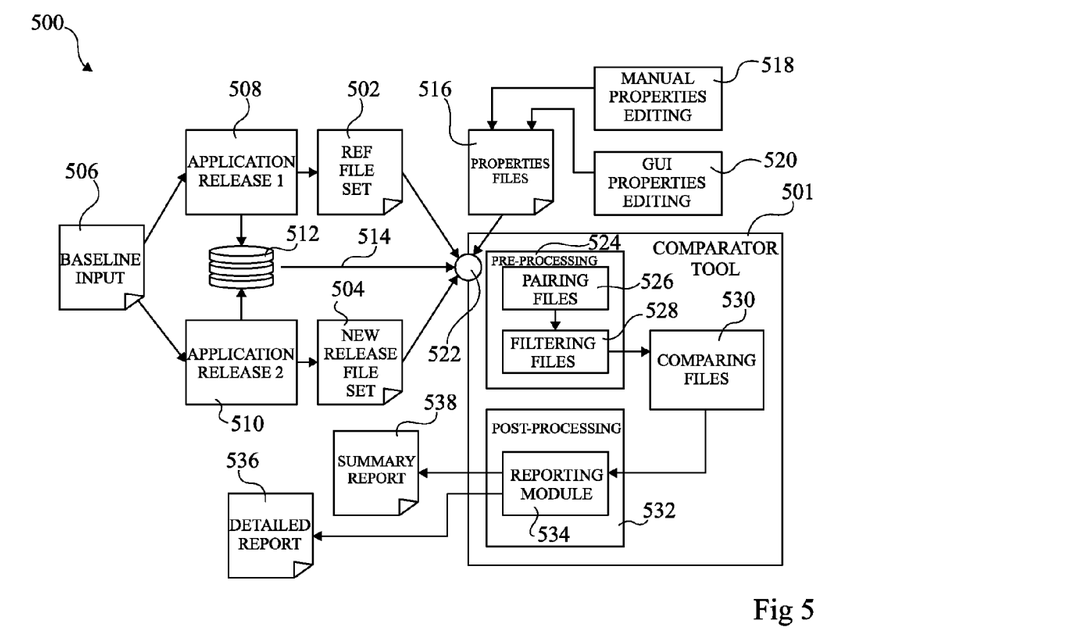
FIG. 5 schematically illustrates a system for comparing files according to a further embodiment of the present invention.

FIG. 5 illustrates a system 500 for verifying different versions of a computer application using a file comparison.

A comparator tool 501 receives a reference file set 502 and a new release file set 504, each comprising one or more files for comparison. In this example, both of these sets of files are generated based on a baseline input file 506. The reference file set 502 is generated by processing the baseline input file 506 by an application release 1, which is the first release 508 of an application. The new release file set is generated by processing the baseline input file 506 by an application release 2, which is a new release 510 of an application, which may for example incorporate additional functionality with respect to the first release 508. Thus the baseline input file for example comprises data that can be extracted and processed by the applications 508 and 510 to generate output files forming the reference file set 502 and the new release file set 504 respectively.

A mapping unit 512 receives inputs from the applications 508 and 510 and generates mapping files 514 indicating the corresponding files of the reference file set 502 and the new release file set 504.

The comparator tool 501 also receives a properties file 516, for example in the ".properties" file format, defining one or more filter parameters that enable data elements to be identified in the files. Each properties file for example has a file name allowing it to be matched to one or more corresponding files. An example of a 3-line properties file containing one filter parameter is as follows:

```
1     #Tue Jul 21 11:53:34 CEST 2009-12-29
2     charset = WINDOWS-1251
3     amount = 442-460, 1290-1308
```

Line 1 comprises text representing a date and time stamp, while line 2 indicates that the Windows 1251 character set is used, and line 3 indicates the location of the data elements, a first of which is located at byte positions 442 to 460 and a second of which is located at byte positions 1290 to 1308 in the file. Each byte for example corresponds to one character, and thus the first and second data elements in this example are both 19 characters.

The properties files 516 are for example manually entered by a user in a standard text editor, as indicated by the manual properties editing block 518, or via a graphical user interface designed to aid users in generating properties files, as indicated by GUI properties block 520. For example, the GUI properties block 520 allows a user to directly select in a document data elements to be filtered out.

The reference file set 502, new release file set 504, mapping files 514 and properties files 516 are all provided to an input 522 of comparator tool. From here, they are treated by a pre-processing block 524. The pre-processing block 524 comprises a pairing files block 526, which pairs each file of the reference file set with a corresponding file of the new release file set based on the mapping files 514 and identifies the corresponding properties file or files. The pairing is for example performed based on a comma-separated values file (.CSV), which lists the file names of the paired files. The pre-processing block 524 also comprises filtering files block 528, in which the files are filtered as described above in relation to FIG. 4 based on parameters defined in the properties files.

The filtered files are then provided to a comparing files block 530, which performs the comparison, for example based on a flat file comparison and/or using a bitap algorithm for fuzzy string searching. An example of a bitap algorithm is the Myer's algorithm, developed by G. Myers and described for example in the publication "A fast bit-vector algorithm for approximate string matching based on dynamic programming" Journal of the ACM 46 (3), May 1999, 395-415.

After file comparison, results of the comparison are provided to a post-processing block 532, and in particular to a reporting module 534, which generates one or more electronic reports for output and/or display to a user. For example, a detailed report 536 may be prepared for each comparison, and comprises an electronic text and/or image file indicating the reference and location of each difference in a new release file of the new release file set 504 with respect to a reference file of the reference file set 502. The detailed report may copy the new release file, and indicate therein all the differences with respect to the reference file. Additionally, or alternatively, a summary report 538 may be prepared for all the comparisons performed for the set of reference files and the set of new release files. The summary report 538 for example indicates an overall result of the comparison, for example a "pass" or "fail", and any errors encountered during the comparison.

Table I below shows an example of a summary report, and the different messages that may be provided to a user based on a successful comparison, and/or based on any errors detected.

TABLE I

| STATUS | MESSAGE | REASON |
| --- | --- | --- |
| OK | OK - Detailed Report | Comparison is OK. No changes in output file. |
| KO | KO - Detailed Report | Comparison is KO. Changes detected in output file. See detailed report for more information. |
| WARNING | WARNING - Reference file is orphan | Reference file is orphan. During pairing step Comparator Tool discovered that reference file does not have an output pair. Verify in output mapping file if expected key exists. The expected key indicates file name of the reference file. |
| WARNING | WARNING - Output file is orphan | Output file is orphan. During pairing step Comparator Tool discovered that an output file does not have an expected pair. Verify in expected mapping file if output key exists. The output key indicates file name of new release file. |
| WARNING | WARNING - Reference file does not exist | Reference file does not exist. Comparator Tool paired reference and new release files thanks to mapping files, but Comparator Tool did not find the reference file in expected folder. Verify existence of reference file in expected folder. |
| WARNING | WARNING - New release file does not exist | New release file does not exist. Comparator Tool paired reference and new release files thanks to mapping files, but Comparator Tool did not find the new release file in new release folder. Verify existence of new release file in new release folder. |
| WARNING | WARNING - Properties file does not exist | Properties file does not exist. Comparator paired reference and new release files thanks to mapping files, and has |

TABLE I-continued

| STATUS | MESSAGE | REASON |
|---|---|---|
| WARNING | WARNING - Properties file is invalid | physically found reference and new release files, but Comparator Tool did not find the properties files in configuration folder. Verify existence of properties file in configuration folder, and also verify that properties file name respects naming convention. Properties file is invalid. During parsing process Comparator Tool can raise this error if two properties have an intersection in their ranges values. For example, the character locations to be filtered fall entirely or partially outside the character range of the file. For example, if a file length is 1022 characters, an error would generated if the character locations to be filter go above 1022. Verify properties file. |

Figure 6:
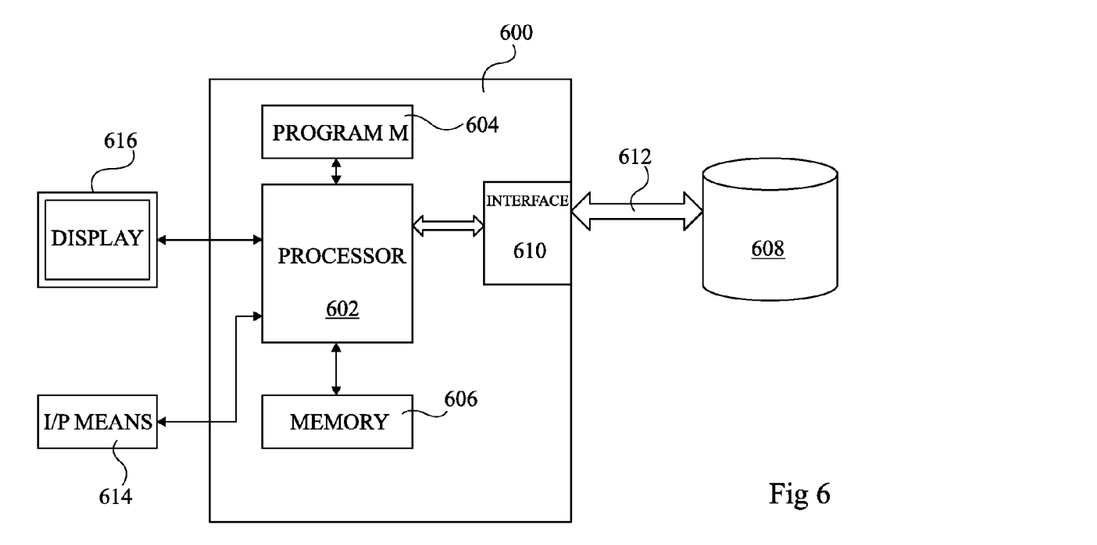
FIG. 6 schematically illustrates a computing system implementing a comparator tool according to embodiments of the present invention.

FIG. 6 illustrates schematically an example of a hardware implementation of the comparator tool described herein. As illustrated, the comparator tool is for example implemented on a computation device 600, which comprises a processor 602 implementing a program stored in a program memory 604, and accessing as needed memory resources 606, which may include cache memory, RAM memory, one or more hard disk drives, or other types of memory storage. The processor 602 also communicates with a database 608 via an interface 610, which is for example a LAN (local area network) interface or WLAN (wireless LAN), and allows access to the database 608 via an intermediary network 612 or other interface.

For example, the database 608 is supported by a server (not shown), which manages and allows access to files form the database. In this way, sets of files to be compared may be fetched by the processor 602 from the database 608 via the interface 610, and stored temporarily in memory 606 while the filtering and comparison steps described above are performed, based on a program stored in the program memory 604. The comparison may be initiated and controlled by a user using input means 614, coupled to a processor 602, and results may be presented to a user by a display 616, which also for example displays a graphical user interface for managing various steps during the implementation of the comparison, such as entering filter parameters.

An advantage of the embodiment described herein is that, by performing a filtering step on the files to remove or replace some data elements, the time and/or complexity of the subsequent comparison can be reduced. In particular, algorithms for comparing data files are complex, as it can be difficult to establish common portions between the files. Thus, removing certain differences between files not only reduces the time needed to detect and report these differences, but also improves the general performance of the comparator.

While a number of specific embodiments of the invention have been described with reference to the figures, it will be apparent to those skilled in the art that there are numerous modifications and variations that may be applied.

For example, while the files have been described in relation to FIG. 5 as being various releases based on a base line input file, more generally, the invention may be applied to any files to be compared by a comparator tool.

Furthermore, while in relation to FIG. 4 it is described that identified elements in the files may be replaced by strings, and in particular different strings for each parameter, it will be apparent to those skilled in the art that depending on the subsequent use of the files, it may be adequate to completely remove a reference to the elements, and/or to replace all elements in all files by one standard reference value, such as a number zero. However, an advantage of replacing elements by a different string for each parameter is that these elements may then be relocated at a later stage if needed.

It will be apparent to those skilled in the art that the various features described in relation to the various embodiments could be combined in any combination in alternative embodiments of the invention.

The invention claimed is:

1. A method of detecting differences in a pair of electronic data files that each file of the pair comprises a plurality of data elements, the method comprising:
    filtering, by a processing device, at least one data element in each file of the pair of electronic data files to omit from a subsequent comparison of the pair of electronic data files, the filtering including:
        identifying the at least one data element in each file of the pair of electronic data files based on one or more filtering parameters defining content and a logical position of the at least one data element within each file of the pair of electronic data files; and
        replacing values of the at least one identified data element in each file of the pair of electronic data files by a same reference value, the replacing including:
            replacing a value of a first data element of the at least one identified data element in each file of the pair of electronic data files with a first same reference value, wherein the first same reference value is a numerical value associated with a filtering parameter associated with the first data element, and
            in response to identifying a second data element in each file of the pair of electronic data files, replacing a value of the second data element of the second identified data element in each file of the pair of electronic data files with a second same reference value that is different than the first same reference value;
    comparing, by the processing device, the filtered pair of electronic data files to detect differences between values of the plurality of data elements; and
    generating, by the processing device, an output report indicating the differences, wherein the generating the output report comprises generating a table including a column to display a status of the comparison, a column to display a message regarding the status, and a column to display a reason for the status.

2. The method of claim 1, wherein the at least one data element in each file of the pair of electronic data files comprises text data with values indicating at least a date value or a time value.

3. A method of comparing a set of electronic data files with a reference set of electronic data files, the method comprising:
pairing each file of the set of electronic data files with a file of the reference set of electronic data files to create a pair of electronic data files;
filtering, by a processing device, at least one data element in each file of the pair of electronic data files to omit from a subsequent comparison of the pair of electronic data files, the filtering including:
identifying the at least one data element based on one or more filtering parameters defining content and a logical position of the at least one data element within each file of the pair of electronic data files; and
replacing values of the at least one identified data element in each file of the pair of electronic data files by a same reference value, the replacing including:
replacing a value of a first data element of the at least one identified data element in each file with a first same reference value, wherein the first same reference value is a numerical value associated with a filtering parameter associated with the first data element, and
in response to identifying a second data element in each file of the pair of electronic data files, replacing a value of the second data element of the second identified data element in each file with a second same reference value that is different than the first same reference value;
comparing each file of the filtered pair of electronic data files to detect differences between values of a plurality of data elements provided in the filtered pair of electronic data files; and
generating an output report indicating the differences for each file of the filtered pair of electronic data files, wherein generating the output report comprises generating a table including a column to display a status of the comparison, a column to display a message regarding the status, and a column to display a reason for the status.

4. A method of validating a new release of a computing application with respect to an older release of the computing application, the method comprising:
executing, by a processing device, the older release of the computing application and the new release of the computing application, on common input data, to generate output files;
filtering, by the processing device, at least one data element in each output file to omit from a subsequent comparison of the output files, the filtering including:
identifying the at least one data element in each output file based on one or more filtering parameters defining content and a logical position of the at least one data element within each output file; and
replacing values of the at least one identified data element in each output file by a same reference value, the replacing including:
replacing a value of a first data element of the at least one identified data element in each output file with a first same reference value, wherein the first same reference value is a numerical value associated with a filtering parameter associated with the first data element, and
in response to identifying a second data element in each file of the pair of electronic data files, replacing a value of a second data element of the second identified data element in each output file with a second same reference value that is different than the first same reference value;
comparing the filtered output files to detect differences between values of a plurality of data elements provided in the filtered output files; and
generating an output report indicating the differences, wherein the generating the output report comprises generating a table including a column to display a status of the comparison, a column to display a message regarding the status, and a column to display a reason for the status.

5. A non-transitory electronic storage medium storing a computer program to compare electronic data files, wherein each file of the electronic data files comprises a plurality of data elements, the program being executable by a processor to:
filter at least one data element in each file of the electronic data files to omit from a subsequent comparison of the electronic data files, the program, when performing the filtering, being further executable by the processor to:
identify the at least one data element in each file of the electronic data files based on a filtering parameter defining content and a logical position of the at least one data element within each file of the electronic data files;
replace values of the at least one identified data element in each file of the electronic data files by a same reference value, the replacing including:
replacing values of a first data element of the at least one identified data element in each file of the electronic data files with a first same reference value, wherein the first same reference value is a numerical value associated with a filtering parameter associated with the first data element, and
in response to identifying a second data element in each file of the pair of electronic data files, replacing a value of a second data element of the second identified data element in each file of the electronic data files with a second same reference value that is different than the first same reference value;
compare the filtered electronic data files to detect differences between values of the plurality of data elements; and
generate an output report indicating the differences, wherein to generate the output report, the program is executable by the processor to generate a table including a column to display a status of the comparison, a column to display a message regarding the status, and a column to display a reason for the status.

6. A device for determining differences between a pair of electronic data files each comprising a plurality of data elements, the device comprising one or more hardware processors to:
filter the pair of electronic data files by identifying at least one data element in each file of the pair of electronic data files to omit from a subsequent comparison of the pair of electronic data files, wherein the pair of electronic data files is filtered based on one or more filtering parameters defining content and a logical position of the at least one data element within each file of the pair of electronic data files, and wherein to filter the pair of electronic data files, the one or more hardware processors:
replace values of the at least one data element in each file of the pair of electronic data files, the replacing including:
replacing a value of a first date element of the at least one data element in each file of the pair of electronic data files with a first same reference value, wherein the first same reference value is a numerical value associated with a filtering parameter associated with the first data element, and in response to identifying a second data element in each file of the pair of electronic data files, replacing a value of the second data element of the second identified data element in each file of the pair of electronic data files with a second same reference value that is different than the first same reference value;

compare the filtered pair of electronic data files to determine differences between values of the plurality of data elements;

generate a report indicating the differences, wherein to generate the report, the one or more processors are to generate a table including a column to display a status of the comparison, a column to display a message regarding the status, and a column to display a reason for the status; and output the report.

7. A computing device to determine differences between a pair of electronic data files each comprising a plurality of data elements, the computing device comprising:

a database storing the pair of electronic data files; and one or more hardware processors to:

identify, based on at least one filtering parameter, at least one data element in each file of the pair of electronic data files to omit from a subsequent comparison of the pair of electronic data files, wherein the at least one filtering parameter defining content and a logical position of the at least one data element within each file of the pair of electronic data files;

replace values of the at least one data element in each file of the pair of electronic data files, the replacing including:

replacing a value of a first date element of the at least one data element in each file of the pair of electronic data files with a first same reference value, wherein the first same reference value is a numerical value associated with a filtering parameter associated with the first data element, and in response to identifying a second data element in each file of the pair of electronic data files, replacing a value of the second data element of the second identified data element in each file of the pair of electronic data files with a second same reference value that is different than the first same reference value;

compare the filtered pair of electronic data files to determine differences between values of the plurality of data elements; and generate a report indicating the differences, wherein to generate the report, the one or more processors are to generate a table including a column to display a status of the comparison, a column to display a message regarding the status, and a column to display a reason for the status.

8. A device for validating a new release of a computing application with respect to an older release of the computing application, the device comprising:

one or more hardware processors to:

receive a pair of output files generated by executing the older release of the computing application and the new release of the computing application on common input data;

filter the pair of output files by:

identifying at least one data element in each file of the pair of output files to omit from a subsequent comparison of the pair of output files based on a filtering parameter defining content and a logical position of the at least one data element within each file of the pair of output files; and replacing values of the at least one data element in each file of the pair of output files, the replacing including:

replacing a value of a first date element of the at least one data element in each file of the pair of electronic data files with a first same reference value, wherein the first same reference value is a numerical value associated with a filtering parameter associated with the first data element, and in response to identifying a second data element in each file of the pair of electronic data files, replacing a value of the second data element of the second identified data element in each file of the pair of electronic data files with a second same reference value that is different than the first same reference value;

compare the filtered pair of output files, and generate a report of differences detected between the filtered pair of output files based on the comparison, wherein to generate the report, the comparison unit is to generate a table including a column to display a status of the comparison, a column to display a message regarding the status, and a column to display a reason for the status.

9. A non-transitory electronic storage medium storing a computer program for comparing a pair of electronic data files, wherein each file of the pair of electronic data files comprises a plurality of data elements, the program being executable by a processor for:

filtering at least one data element in each file of the pair of electronic data files to omit from a subsequent comparison of the pair of electronic data files, the filtering including:

identifying the at least one data element in each file of the pair of electronic data files based on one or more filtering parameters defining content and a logical position of the at least one data element within each file of the pair of electronic data files; and replacing values of the at least one identified data element in each file of the pair of electronic data files, the replacing including:

replacing a value of a first date element of the at least one data element in each file of the pair of electronic data files with a first same reference value, wherein the first same reference value is a numerical value associated with a filtering parameter associated with the first data element, and in response to identifying a second data element in each file of the pair of electronic data files, replacing a value of the second data element of the second identified data element in each file of the pair of electronic data files with a second same reference value that is different than the first same reference value;

comparing, by the device, the filtered pair of electronic data files to detect differences between values of the plurality of data elements; and generating, by the device, an output report indicating the differences, wherein generating the output report comprises generating a table including a column to display a status of the comparison, a column to display a message regarding the status, and a column to display a reason for the status.

10. The device of claim 6, where the one or more processors are further to:
pair each file of a set of electronic data files with a file of a reference set of data files and to create the pair of electronic data files.

\* \* \* \* \*